United States Patent
Hirotsu et al.

(10) Patent No.: US 12,498,362 B2
(45) Date of Patent: Dec. 16, 2025

(54) METHOD FOR EXAMINING CANCER IN PET ANIMAL

(71) Applicant: Hirotsu Bio Science Inc., Chiyoda-ku (JP)

(72) Inventors: Takaaki Hirotsu, Tokyo (JP); Satoru Kaifuchi, Tokyo (JP); Toshimi Sugimoto, Tokyo (JP); Hideshi Ishii, Tokyo (JP); Masamitsu Konno, Tokyo (JP); Yuji Ueda, Tokyo (JP); Shogo Kobayashi, Tokyo (JP); Hidetoshi Eguchi, Tokyo (JP); Yuichiro Doki, Tokyo (JP); Masaki Mori, Tokyo (JP)

(73) Assignee: Hirotsu Bio Science Inc., Chiyoda-ku (JP)

( * ) Notice: Subject to any disclaimer, the term of this patent is extended or adjusted under 35 U.S.C. 154(b) by 129 days.

(21) Appl. No.: 17/268,164

(22) PCT Filed: Aug. 14, 2019

(86) PCT No.: PCT/JP2019/031912
§ 371 (c)(1),
(2) Date: Feb. 12, 2021

(87) PCT Pub. No.: WO2020/036187
PCT Pub. Date: Feb. 20, 2020

(65) Prior Publication Data
US 2021/0215669 A1    Jul. 15, 2021

(30) Foreign Application Priority Data
Aug. 14, 2018    (JP) .................................. 2018-152607

(51) Int. Cl.
*G01N 33/493*    (2006.01)

(52) U.S. Cl.
CPC ... *G01N 33/493* (2013.01); *G01N 2800/7028* (2013.01)

(58) Field of Classification Search
CPC ......... G01N 33/493; G01N 2800/7028; G01N 2333/43534; G01N 33/5029; G01N 33/5085
See application file for complete search history.

(56) References Cited

U.S. PATENT DOCUMENTS

| | | |
|---|---|---|
| 2017/0016906 A1 | 1/2017 | Hirotsu et al. |
| 2019/0094205 A1 | 3/2019 | Sakairi |
| 2019/0369084 A1 | 12/2019 | Hirotsu et al. |

FOREIGN PATENT DOCUMENTS

| | | | |
|---|---|---|---|
| CN | 103487493 A | | 1/2014 |
| EP | 3081935 | * | 10/2016 |

(Continued)

OTHER PUBLICATIONS

Extended European Search Report issued Mar. 10, 2022 in corresponding European Patent Application No. 19849382.7, 9 pages.

(Continued)

*Primary Examiner* — Samuel P Siefke
(74) *Attorney, Agent, or Firm* — Oblon, McClelland, Maier & Neustadt, L.L.P.

(57) ABSTRACT

A method of examining for cancer in a non-primate mammal such as a pet animal may include, for example, a method of examining or diagnosing for cancer in a non-primate mammal, including evaluating taxic behavior of nematodes toward a urine sample from a subject mammal.

14 Claims, 2 Drawing Sheets

(56) References Cited

FOREIGN PATENT DOCUMENTS

| WO | WO 2015/088039 A1 | | 6/2015 |
|---|---|---|---|
| WO | WO 2017/213246 | * | 12/2017 |
| WO | WO 2017/213246 A1 | | 12/2017 |
| WO | WO 2018/047959 A1 | | 3/2018 |
| WO | WO2020/218501 A1 | | 10/2020 |

OTHER PUBLICATIONS

Yuji Ueda et al., "Application of *C. elegans* cancer screening test for the detection of pancreatic tumor in genetically engineered mice", Oncotarget, vol. 10, No. 52, XP55895824, Jan. 1, 2019, pp. 5412-5418.

International Search Report issued on Nov. 12, 2019 in PCT/JP2019/031912 filed on Aug. 14, 2019, 2 pages.

Matsumura, "Volatile biomarkers for lung cancer", Aroma Research, 2011, vol. 12, No. 2, pp. 129-135 (9 total pages).

Hirotsu et al., "A Highly Accurate Inclusive Cancer Screening Test Using *Caenorhabditis elegans* Scent Detection", PLoS One, 2015, vol. 10, No. 3, pp. 1-15.

Iino et al., "Explore molecular mechanisms of sensory reception, Receptor Research of olfaction, taste, and sense of pain and potential for medical applications, Chemical senses and chemotaxis behavior in nematodes", Experimental medicine, 2000, vol. 18, No. 17, pp. 2314-2319.

Combined Chinese Office Action and Search Report issued Feb. 20, 2023 in Chinese Patent Application No. 201980052011.5, 5 pages.

Toshimi Sugimoto et al., "A New Detection Method for Canine and Feline Cancer Using the Olfactory System of Nematodes," Biochemistry and Biophysics Reports, 32, (2022) 101332, 6 pages.

Office Action issued Dec. 20, 2023, in Japanese Patent Application No. 201980052011.5.

Cornelia I. Bargmann, et al., "Odorant-Selective Genes and Neurons Mediate Olfaction in *C. Elegans*", Cell, vol. 74, 515-527, Aug. 13, 1993.

Kazushi Yoshida, et al., Odour Concentration-Dependent Olfactory Preference Change in *C. elegans, Nature Communications*, 3:739, DOI: 10.1038, Published Mar. 13, 2012, pp. 1-11.

* cited by examiner

METHOD FOR EXAMINING CANCER IN PET ANIMAL

TECHNICAL FIELD

The present invention relates to a method of examining for cancer in a pet animal.

BACKGROUND ART

Various methods have been developed to detect cancer easily and inexpensively. Cancer in humans can be diagnosed by using the taxic behavior of nematodes as an index, that is, using the principle that nematodes show attractive behavior toward urines from human cancer patients and nematodes show avoidance behavior against urines from healthy subjects (refer to Patent Literature 1).

CITATION LIST

Patent Literature

Patent Literature 1: WO2015/088039

SUMMARY OF INVENTION

The present invention relates to a method of examining for cancer in a pet animal.

The present inventors have shown that nematodes exhibit taxic behavior toward urines from pet animals having cancer, such as dogs, cats, and mice. The present invention has been based on this finding.

More specifically, the present invention provides the followings:

(1) A method of examining or diagnosing for cancer in a non-primate mammal, comprising:
    evaluating taxic behavior of nematodes toward a urine sample from the subject;
(2) The method according to (1) described above, wherein the mammal is a mammal selected from a canine, a feline, and a rodent;
(3) The method according to (1) or (2) described above, wherein the mammal is a dog;
(4) The method according to (1) or (2) described above, wherein the mammal is a cat; and
(5) The method according to (1) or (2) described above, wherein the mammal is a rodent.

DETAILED DESCRIPTION OF THE INVENTION

Figure 1:
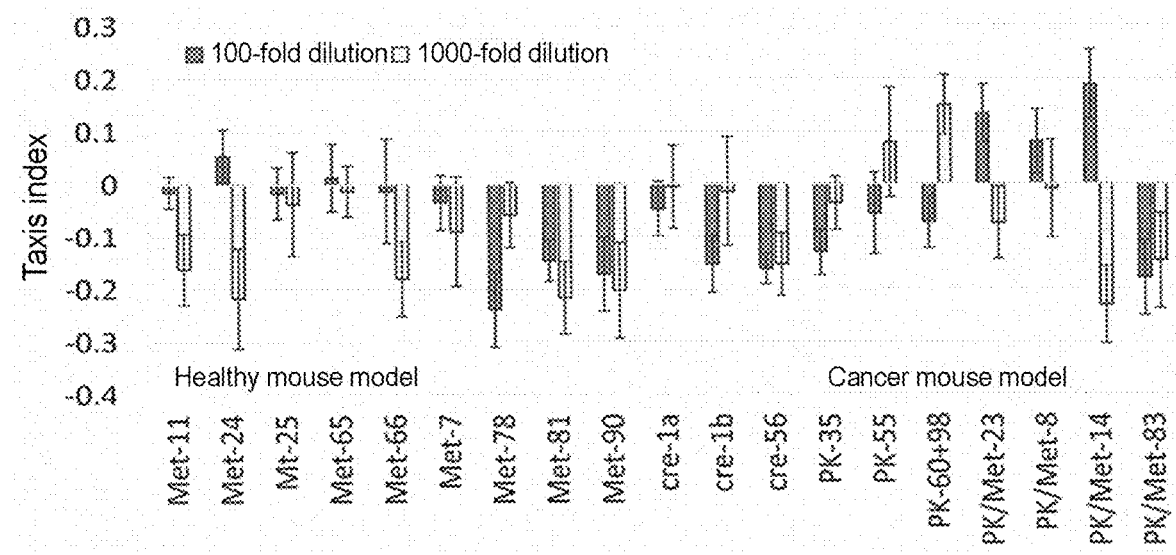
FIG. 1 shows the taxic behavior of nematodes toward urine from rodents with cancer or rodents without cancer (healthy). One bar graph corresponds to each individual.

In the present description, the term "subject" means a non-human mammal, such as a non-primate mammal. In the present description, the term "subject" is also used to mean a healthy subject, a subject suspected of having cancer, and a subject suffering from cancer. In the present description, the term "subject suspected of having cancer" includes not only a subject that is clearly suspected of having cancer but also a subject that has not been specifically suspected of having cancer.

In the present description, the term "cancer" means a malignant tumor. Cancers can be broadly classified into hematopoietic tumors, epithelial cancers (carcinoma), and non-epithelial sarcomas (sarcomas). Examples of the hematopoietic tumors include leukemia, malignant lymphoma, and myeloma. Examples of the epithelial cancers include lung cancer, breast cancer, stomach cancer, colon cancer, liver cancer, uterine cancer, ovarian cancer, head and neck cancer, and tongue cancer. Examples of the sarcomas include osteosarcomas, chondrosarcomas, rhabdomyosarcomas, leiomyosarcoma, fibrosarcomas, liposarcomas, and angiosarcomas.

In the present description, the term "detecting cancer" can be read as "detecting cancer cells", "identifying cancer", "judging cancer", "method for assisting in cancer diagnosis", or "method for obtaining preliminary information for cancer diagnosis". The method of the present invention is an industrially applicable method.

In the present description, the term "nematode" means *Caenorhabditis elegans*. For the nematode, strains isolated from various environments are registered and published at the *Caenorhabditis* Genetics Center (CGC) of the Faculty of Biological Sciences, University of Minnesota, USA, and can be distributed. Therefore, those skilled in the art can obtain most of known strains from CGC. Hermaphrodite can be preferably used from the viewpoint of being able to reproduce by self-fertilization.

In the present description, the term "taxic behavior" means attractive behavior or avoidance behavior. The attractive behavior means the behavior of decreasing the physical distance from a certain substance, and the avoidance behavior means the behavior of increasing the physical distance from a certain substance. A substance that induces attractive behavior is called an attractant, and a substance that induces avoidance behavior is called a repellent. Nematodes have the property of being attracted to attractants and repelling repellents by the sense of smell. The behavior of being attracted toward attractants is called attractive behavior (sometimes referred to as "positive" in the present description), and the behavior of repelling repellents is referred to as avoidance behavior (sometimes referred to as "negative" in the present description). In addition, the attractive behavior and the avoidance behavior are collectively called taxic behavior.

In the present description, the term "wild strain" is a wild strain of nematodes, and an example thereof includes N2 Bristol strain, which is a general wild strain.

The present invention provides a method for detecting cancer in a subject that has or is suspected of having cancer (or a method of prediction, a method of diagnosis, or a method for obtaining basic information on the therapeutic effect), comprising evaluating the taxic behavior of nematodes toward a urine sample from the subject.

The subject is preferably a non-human mammal or a non-human primate, preferably a rodent (for example, mouse, rat, hamster, chinchilla, rabbit, guinea pig, mouse, prairie dog, momonga, and squirrel), a canine (for example, dog, fox, raccoon dog, and fennec fox), and a feline (for example, cat, domestic cat, and wildcat), which can be used as the subject in the present invention.

Wild-type nematodes (for example, N2 Bristol strain) can be used as the nematodes. The nematode strain exhibits attractive behavior toward a urine from a cancer patient, and therefore such nematodes exhibiting the attractive behavior toward a urine from a cancer patient can be used as the nematodes in the present invention.

A urine sample can be obtained from a subject. The urine sample may be diluted with a solvent such as water when evaluated by the method of the present invention. In the dilution, for example, the dilution factor may be 5-fold to 20000-fold, for example, the dilution factor may be 10-fold to 10000-fold, for example, the dilution factor may be 10-fold to 5000-fold, the dilution factor may be 10-fold to 2000-fold, and for example, the dilution factor may be 100-fold to 1000-fold, and the nematode also exhibits taxic behavior toward diluted urine samples. In some aspects of the present invention, the dilution factor of urine can be, for example, 100-fold or 1000-fold, or the dilution factors can be in combination of two or more, including 100-fold and 1000-fold. For example, the dilution factor of the dog urine sample may be 10-fold to 2000-fold, for example, 100-fold to 1000-fold. For example, the dilution factor of the cat may be 5-fold to 20000-fold, and the dilution factor may be 10-fold to 10000-fold, for example, 500-fold to 5000-fold.

The taxic behavior of nematodes can be evaluated by placing a urine sample and nematodes at respective positions that are separated at a certain distance (for example, a distance of about 1 cm to about 5 cm) and then observing whether the nematodes exhibit attractive behavior toward or avoidance behavior against the urine sample. The taxic behavior can be observed on a solid medium such as an agar medium.

Method of Analyzing Urine with Nematodes

The analysis of urine with nematodes can be performed by placing the test sample (for example, urine) obtained from the subject and the nematodes at respective positions that are separated at a certain distance, and then by observing whether the nematodes exhibit attractive behavior toward or avoidance behavior against the test sample. When the nematodes exhibit attractive behavior, the subject can be evaluated to suffer from cancer or to have the possibility of having cancer. When the nematodes exhibit avoidance behavior, the subject can be evaluated to have no cancer or to have the possibility of having no cancer. An example of the analysis method with a human specimen is as disclosed in WO2015/088039, the entirety of which is incorporated herein by reference.

More specifically, examples of the method of analyzing urine with nematodes can include:

placing the test sample (for example, urine sample) obtained from the subject onto a petri dish (for example, a petri dish into which a solid medium has been introduced);

placing the nematodes separated at a certain distance from the test sample in the petri dish where the test sample has been placed; and then allowing the nematodes to move.

The method of analyzing urine with nematodes can include determining that the subject suffers from cancer or has the possibility of suffering from cancer when the nematodes exhibit taxic behavior toward the test sample.

The taxic behavior of nematodes can be evaluated by a difference or ratio between the number of nematodes approaching the test sample and the number of nematodes far from the test sample. In evaluation based on a difference in the numbers of nematodes, a plus value difference allows the test sample to be evaluated overall as inducing attractive behavior and being derived from a cancer patient, and/or a minus value difference allows the test sample to be evaluated overall as inducing avoidance behavior and being derived from a subject without cancer. In evaluation based on the ratio of the numbers of nematodes, a ratio of 1 or more allows the test sample to be evaluated as inducing attractive behavior and being derived from a subject having cancer, and/or a ratio of less than 1 allows the test sample to be evaluated as inducing avoidance behavior and being derived from a subject without cancer. In addition, the taxic behavior of nematodes can be evaluated by using the taxis index as an index, for example, as follows.

$$(\text{Taxis Index}) = \frac{A - B}{A + B} \quad \text{[Formula 1]}$$

In the formula, A is the number of nematodes that exhibit attractive behavior toward the test sample, and B is the number of nematodes that exhibit avoidance behavior against the test sample.

A plus value of taxis index allows the test sample to be evaluated overall as inducing attractive behavior and being derived from the subject with cancer, and a minus value of taxis index allows the test sample to be evaluated as inducing avoidance behavior and being derived from the subject without cancer.

The taxis index closer to 1 means a larger proportion of nematodes that exhibit attractive behavior, the taxis index closer to −1 means a larger proportion of nematodes that exhibit avoidance behavior, and the taxis index closer to 0 means that nematodes exhibit neither attractive behavior nor avoidance behavior. A larger absolute value of the taxis index gives a clearer evaluation result of the behavior. If the nematodes that exhibit taxic behavior and the nematodes that exhibit avoidance behavior are similar in the number, it may be then evaluated as positive (in the case of positive, more detailed examination may be performed) or may be excluded from evaluation. In the present invention, an individual who is the source of a positive urine sample can be subjected to a further detailed examination to determine whether or not the individual has cancer.

In the case of examining urine samples with two or more of different dilution factors, any one of the urine samples is positive, which may be determined as cancer from the viewpoint of improving sensitivity, or all of the urine samples are positive, which may be determined as cancer from the viewpoint of improving specificity.

The subjects that have been evaluated to have cancer by the method of the present invention can then be treated for cancer (for example, chemotherapy, radiation therapy, surgical resection, and a combination thereof). The subjects that have been evaluated to have cancer by the method of the present invention may undergo more detailed examination to receive a definitive diagnosis of cancer.

Example

Example 1: Cancer Test with Rodent Urine

In the present example, the taxic behavior of nematodes toward rodent urine samples was evaluated.

Mice were used as a rodent. Urine samples were collected from healthy mice and mice having cancer. Mice having c-Met deficiency and developing no cancer (C57Bl/6 strain) were used as healthy mice, and mice having KrasG12D mutation (refer to Noguchi K. et al., Oncology Letters, 16: 1892-1898, 2018) were used as mice having cancer. The urine samples were diluted 100-fold and the taxic behavior of nematodes toward the urine samples were evaluated by the method described in WO2015/088039. Wild-type nematodes (N2 Bristol strain) were used as the nematodes. The taxic behavior was evaluated by using the taxis index. Measurements were repeated 12 times (the same applies hereinafter) to obtain the average value of the taxis index for each individual. The results of taxic behavior toward the urine samples were as shown in FIG. 1.

$$\text{(Taxis Index)} = \frac{A-B}{A+B} \quad \text{[Formula 1]}$$

In the formula, A is the number of nematodes that exhibit attractive behavior toward the test sample, and B is the number of nematodes that exhibit avoidance behavior against the test sample.

As shown in FIG. 1, the taxis index of urine samples from healthy mice was a minus value or 0.05 or less for almost all cases, whereas the taxis index of urines from mice with cancer was more than 0.05 for urines from three strains. This revealed that mice with cancer can be evaluated by evaluating the taxic behavior of nematodes toward urine samples. When the PK–60+98 urine sample was used at a 1000-fold dilution, the nematodes exhibited attractive behavior toward the urine sample (the taxis index was about 0.15). In the case of 1000-fold dilution, the nematodes exhibited attractive behavior toward urine samples from mice with three cancers. As described above, it was revealed that the nematodes exhibited attractive behavior toward urines from the cancer mouse model in both the 100-fold dilution and the 1000-fold dilution. The plus taxis index was evaluated as positive and the minus taxis index was evaluated as negative, and as a result of such evaluation, 100-fold dilution showed a sensitivity of 28.6% and a specificity of 100%, and 1000-fold dilution showed a sensitivity of 42.8% and a specificity of 83.3%. It was thus revealed that the presence or absence of cancer can be evaluated by evaluating the taxic behavior of nematodes toward rodent urine.

In addition, the plus taxis index is evaluated as positive in either the 100-fold dilution or the 1000-fold dilution, and the minus taxis index is evaluated as negative in both the 100-fold dilution and the 1000-fold dilution, and as a result of such evaluation, the sensitivity is 71.4% (five mice out of seven mice) and the specificity was 83.3% (10 mice out of 12 mice). This result revealed that the examination for cancer with the taxic behavior of nematodes as an index is effective for rodent mice.

Thereafter, urine samples were collected from healthy dogs and dogs with cancer, respectively, and the taxic behavior of nematodes was evaluated by using urine diluted 1000-fold in the same manner as in Example 1.

Figure 2:
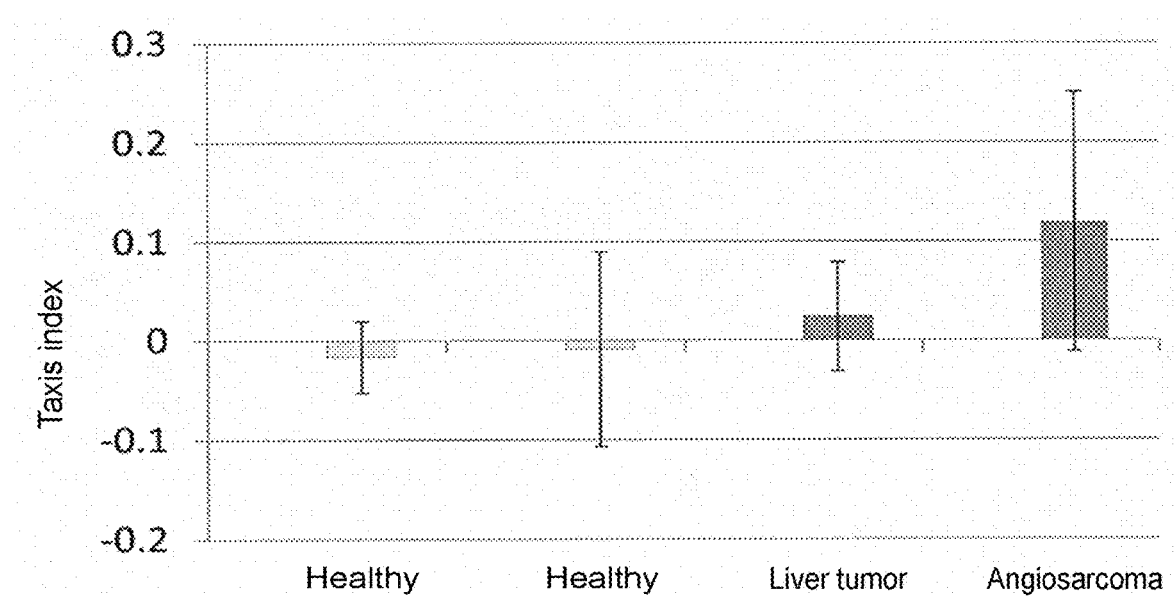
FIG. 2 shows the taxic behavior of nematodes toward urines from dogs with cancer or dogs without cancer (healthy). One bar graph corresponds to each individual.

Healthy Chihuahuas, healthy Jack Russell Terriers, golden retrievers with hemangiosarcoma, and Scottish terriers with liver tumors were used as dogs. The results were as shown in FIG. 2. As shown in FIG. 2, the taxis index for urines from healthy dogs was minus, whereas the taxis index for urines from dogs with cancer was plus. In dogs, both sensitivity and specificity were 100%. This result revealed that the examination for cancer with the taxic behavior of nematodes as an index is effective for dogs.

Moreover, urine samples were collected from healthy cats and cats with cancer, respectively, and the taxic behavior of nematodes was evaluated by using urine diluted 1000-fold.

Figure 3:
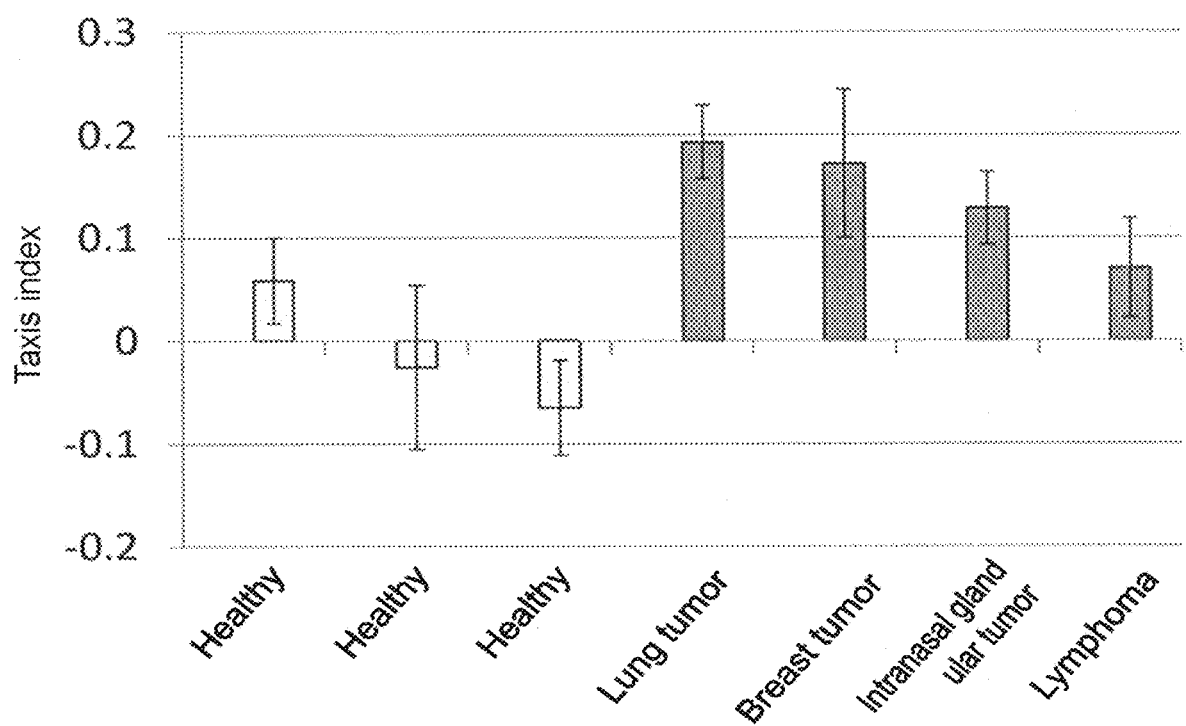
FIG. 3 shows the taxic behavior of nematodes toward urines from cats with cancer or cats without cancer (healthy). One bar graph corresponds to each individual.

Healthy exotic shorthair (two cats), healthy Mix, American shorthair with lung tumor, Mix with breast tumor, Mix with intranasal adenocarcinoma, and Persian with lymphoma were used as cats. The results were as shown in FIG. 3. As shown in FIG. 3, the taxis index for urines from healthy cats was clearly lower than the taxis index for urines from cats with cancer. The plus taxis index was evaluated as positive and the minus taxis index was evaluated as negative, and as a result of such evaluation, the sensitivity was 100% (four cats out of four cats) and the specificity was 66.7% (two cats out of three cats). This result revealed that the examination for cancer with the taxic behavior of nematodes as an index is effective for cats.

The above results revealed that the examination for cancer with the taxic behavior of nematodes as an index is effective for dogs, cats, and rodent mice. As described above, pet animals can be diagnosed for cancer inexpensively and quickly by urinalysis using the taxic behavior of nematodes as an index.

In the above urine samples from dogs and cats, the taxic behavior of nematodes was similarly detected by changing the dilution factor of urine. As for dogs, the urine samples derived from the dogs having liver tumors or angiosarcomas showed plus taxis indexes at least for 10-fold dilution to 1000-fold dilution. In addition, as for cats, the urine samples derived from the cats having tumors showed plus taxis indexes at least for 10-fold dilution to 10000-fold dilution.

The invention claimed is:

1. A method of diagnosing cancer in a dog or cat, the method comprising:
   providing a urine sample from a dog or from a cat;
   diluting the urine sample in a solvent to provide a first diluted urine sample having a first dilution factor;
   diluting the urine sample in a solvent to provide a second diluted urine sample having a second dilution factor;
   placing N2 Bristol strain nematodes at a predetermined distance from each of the first diluted urine sample and the second diluted urine sample
   assaying attraction of nematodes to the first and second diluted urine samples; and
   detecting attraction of nematodes to at least one of the first and second diluted urine samples, thereby diagnosing cancer,
   wherein the cancer is a liver tumor or angiosarcoma when the urine sample is
   from a dog and wherein the cancer is a lung tumor, breast tumor, intranasal glandular tumor or lymphoma when the urine sample is from a cat;
   wherein the first and second dilution factors are different and are each independently selected from a dilution factor that is from $1\times10^{-2}$ to $1\times10^{-3}$.

2. The method of claim 1, wherein the urine sample is from a dog.

3. The method of claim 1, wherein the urine sample is from a cat.

4. The method of claim 1, wherein the cancer comprises a liver tumor or angiosarcoma.

5. The method of claim 1, wherein the cancer comprises a lung tumor, breast tumor, or intranasal glandular tumor.

6. The method of claim 1, wherein the cancer comprises a lymphoma.

7. The method of claim 1, wherein the solvent is water.

8. The method of claim 1, wherein the detecting of attraction to at least one of the first and second diluted urine samples comprises placing the sample and/or the nematodes onto a solid medium.

9. The method of claim 8, wherein the solid medium is agar.

10. The method of claim 1, wherein the detecting of attraction to at least one of the first and second diluted urine samples comprises:
   placing the diluted urine samples into a container comprising a solid medium;
   placing the nematodes separated at a predetermined distance from the diluted urine samples in the container; and then
   allowing the nematodes to move.

11. The method of claim 9, wherein the predetermined distance is from 1 to 5 cm.

12. The method of claim 1, wherein the detecting of attraction to at least one of the first and second diluted urine samples comprises comparing a difference or ratio between a first number of the nematodes approaching the test sample to a second number of nematodes far from the urine sample.

13. The method of claim 1, wherein the detecting of attraction to at least one of the first and second diluted urine samples comprises by using a taxis index of formula (1)

$$(\text{Taxis Index}) = \frac{A-B}{A+B}, \qquad (1)$$

wherein A is a number of nematodes exhibiting attractive behavior toward the at least one sample, and B is a number of nematodes exhibiting avoidance behavior against the at least one sample.

14. The method of claim 1, further comprising treating the dog or cat by administering at least one therapy selected from the group consisting of:
   (a) chemotherapy for the cancer,
   (b) radiation therapy for the cancer, and
   (c) surgical resection of the cancer.

* * * * *